(12) United States Patent
Lv

(10) Patent No.: US 9,593,689 B2
(45) Date of Patent: Mar. 14, 2017

(54) FAN CONTROL CIRCUIT

(71) Applicant: Alpha Networks Inc., Hsinchu (TW)

(72) Inventor: Cheng-Xian Lv, Hsinchu (TW)

(73) Assignee: ALPHA NETWORKS INC. (TW)

( * ) Notice: Subject to any disclaimer, the term of this patent is extended or adjusted under 35 U.S.C. 154(b) by 120 days.

(21) Appl. No.: 14/309,237

(22) Filed: Jun. 19, 2014

(65) Prior Publication Data

US 2015/0229253 A1 Aug. 13, 2015

(30) Foreign Application Priority Data

Feb. 12, 2014 (CN) .................... 2014 2 0062700 U

(51) Int. Cl.
| | |
|---|---|
| *H02P 6/18* | (2016.01) |
| *G01N 21/00* | (2006.01) |
| *G08B 3/00* | (2006.01) |
| *F04D 27/00* | (2006.01) |
| *H02P 7/29* | (2016.01) |
| *F04D 25/06* | (2006.01) |

(52) U.S. Cl.
CPC .............. *F04D 27/004* (2013.01); *H02P 7/29* (2013.01); *F04D 25/0613* (2013.01)

(58) Field of Classification Search
USPC ........................ 318/400.12; 327/509; 34/549
See application file for complete search history.

(56) References Cited

U.S. PATENT DOCUMENTS

| | | | | |
|---|---|---|---|---|
| 6,650,074 B1* | 11/2003 | Vyssotski | ................ | G06F 1/206 318/400.12 |
| 2008/0148597 A1* | 6/2008 | Kim | | |
| 2012/0092061 A1* | 4/2012 | Hsieh | ...................... | G06F 1/206 327/509 |

* cited by examiner

*Primary Examiner* — Eduardo Colon Santana
*Assistant Examiner* — Cortez Cook
(74) *Attorney, Agent, or Firm* — Bacon & Thomas, PLLC

(57) ABSTRACT

The present invention is to provide a fan control circuit, which includes a filter circuit for converting a pulse-width modulation (PWM) voltage signal into a DC voltage signal; an amplifier circuit having an input end for receiving the DC voltage signal and a static voltage signal and generating an amplified voltage signal at an output end thereof; a current expansion circuit configured to perform current expansion on the amplified voltage signal and thereby generate a driving voltage signal for a fan; and a feedback circuit connected between another input end of the amplifier circuit and an output end of the current expansion circuit so that magnitude of the driving voltage signal is in direct proportion to the duty cycle of the PWM voltage signal and is greater than or equal to a lowest driving voltage value of the fan when the duty cycle of the PWM voltage signal approaches zero.

7 Claims, 2 Drawing Sheets

FAN CONTROL CIRCUIT

FIELD OF THE INVENTION

The present invention relates to a control circuit, more particular to a fan control circuit, which is able to convert a pulse-width modulation (PWM) voltage signal into a DC voltage signal, generate an amplified voltage signal according to the DC voltage signal and a static voltage signal, perform current expansion on the amplified voltage signal to generate a driving voltage signal for a fan, and control magnitude of the driving voltage signal to be in direct proportion to the duty cycle of the PWM voltage signal and be greater than or equal to a lowest driving voltage value of the fan when the duty cycle of the PWM voltage signal approaches zero.

BACKGROUND OF THE INVENTION

With the rapid development of microelectronics, the technology of central processing units (CPUs) gradually matures. While the processing efficiency and speed of CPUs are improving, the increase of their operating clocks leads to the generation of more heat during operation; therefore, the demand for heat dissipation is growing. To deal with such a demand, a novel fan was developed using the pulse-width modulation (PWM) technique. The PWM fan is used in conjunction with a computer which when in operation generates a PWM voltage signal according to the temperature of its CPU. A PWM voltage signal is composed of many digital pulses and provides control in a way similar to analog signals. The proportion of time of the pulses in a PWM voltage signal is referred to as the "duty cycle". For example, a duty cycle of 10% means that the computer drives the PWM fan into operation in 10% of the time and leaves the PWM fan idle in the remaining 90% of the time. By varying the duty cycle, the computer can effectively adjust the rotating speed of the fan to ensure proper operation of the CPU.

Compared with the conventional fans, a PWM fan features higher heat dissipation efficiency and precision. However, as a PWM fan must be equipped with a corresponding control chip in order to receive PWM voltage signals, the production costs of PWM fans are far higher than those of the conventional fans, which are typically controlled by the level of voltage. In order for a conventional fan to receive PWM voltage signals and work as a PWM fan, a control circuit was developed as shown in FIG. 1. The control circuit 1 in FIG. 1 is composed of a filter circuit 11, an operational amplifier 12, a switch circuit 13, and a feedback circuit 14. The filter circuit 11 is configured to receive the PWM voltage signal transmitted from a processing unit and convert the PWM voltage signal into a direct-current (DC) voltage signal, wherein the magnitude of the DC voltage signal is in direct proportion to the duty cycle of the PWM voltage signal. The operational amplifier 12 is configured to amplify the DC voltage signal so as to control the transistor Q in the switch circuit 13 and instruct the transistor Q to output a driving voltage signal to a fan 10.

The control circuit 1 nevertheless has several drawbacks in use, and the most important reason is this: the driving voltage of a conventional fan is approximately between 4 and 13 V, but the PWM voltage signal, whose duty cycle ranges from 0% to 100%, is converted by the control circuit 1 to 0~13 V. Since a voltage of 0~4 V cannot drive the fan 10 into operation, a PWM voltage signal whose duty cycle is 0~15% does not work for the fan 10 (assuming a PWM voltage signal whose duty cycle is 15% is converted to 4 V). That is to say, a "non-correspondence in signal conversion" arises.

Another important issue with the control circuit 1 is that the operation of the fan 10 cannot be effectively stopped, and this is due to the fact that the control circuit 1 controls the value of the driving voltage output from the switch circuit 13 to the fan 10 based on the output voltage of the operational amplifier 12. Referring to FIG. 1, the output voltage of the operational amplifier 12 is supplied to the control end of the transistor Q so that the voltage difference between the other two ends of the transistor Q can be adjusted according to the output voltage. In other words, in order for the control circuit 1 to stop the operation of the fan 10, the output voltage of the operational amplifier 12 must be equal to the supply voltage of the switch circuit 13 (e.g., 12 V). However, since the supply voltage for driving the operational amplifier 12 and the switch circuit 13 is in most cases provided by the same supply unit Vcc, the output voltage of the operational amplifier 12 can never be as high as the supply voltage, simply considering the loss in the operational amplifier 12; consequently, the operation of the fan 10 cannot be effectively stopped. The control circuit 1, therefore, exhibits "poor control".

In light of the above, the inventor of the present invention wondered if it is possible to design a novel circuit structure which not only can solve the lowest driving voltage problem of the conventional fans, but also can stop the operation of a fan precisely at any moment according to the state of a computer. The issue to be addressed by the present invention, hence, is to overcome the aforesaid problems by providing an improved and easy-to-manufacture circuit structure.

BRIEF SUMMARY OF THE INVENTION

In view of the fact that a conventional control circuit configured for converting a PWM voltage signal fails to meet the lowest driving voltage value of a fan and cannot turn off the fan, the inventor of the present invention incorporated years of practical experience into extensive research and tests and finally succeeded in developing a fan control circuit as disclosed herein. The fan control circuit is intended to effectively solve the various problems of the conventional circuits and increase the precision in fan control.

It is an objective of the present invention to provide a fan control circuit applicable to the circuit board of an electronic device (e.g., a computer, a network apparatus, etc.). The electronic device includes a processing unit and a fan. The processing unit and the fan are electrically connected through the circuit board. The fan control circuit includes a filter circuit, an amplifier circuit, a current expansion circuit, and a feedback circuit. The input end of the filter circuit is electrically connected to the processing unit in order to receive therefrom a pulse-width modulation (PWM) voltage signal and convert the PWM voltage signal into a DC voltage signal, wherein the magnitude of the DC voltage signal corresponds to the duty cycle of the PWM voltage signal. The positive input end of the amplifier circuit is configured to receive the DC voltage signal and a static voltage signal so as for the amplifier circuit to amplify the DC voltage signal and the static voltage signal and generate an amplified voltage signal at the output end of the amplifier circuit. The input end of the current expansion circuit is connected to the output end of the amplifier circuit while the output end of the current expansion circuit is connected to the fan. The current expansion circuit is configured to perform current expansion on the amplified voltage signal and thereby generate a driving voltage signal and a driving current signal at the output end of the current expansion circuit. The two ends of the feedback circuit are respectively connected to the negative input end of the amplifier circuit and the output end of the current expansion circuit so that the magnitude of the driving voltage signal, which is derived from the DC voltage signal through the amplifier circuit, the current expansion circuit, and the feedback circuit, is in direct proportion to the duty cycle of the PWM voltage signal, and that the driving voltage signal is greater than or equal to the lowest driving voltage value of the fan when the duty cycle of the PWM voltage signal approaches zero. Thus, the present invention solves one major problem of the prior art, namely the failure of the conventional fan control circuits to consider the lowest driving voltage value of a fan. As previously mentioned, the failure makes it impossible for a fan to work in the ideal fashion even after conversion of the PWM voltage signal.

Another objective of the present invention is to provide the foregoing fan control circuit, wherein the current expansion circuit is composed of two transistors connected in a cascade, and wherein the output driving voltage signal is delivered to the amplifier circuit through negative feedback. Therefore, the circuit design of present invention not only features fast response, but also enhances the stability of the fan control circuit lest the precision of signal processing be compromised by the influence of temperature.

Still another objective of the present invention is to provide the foregoing fan control circuit, wherein the fan control circuit further includes a comparison circuit electrically connected to the processing unit. The comparison circuit is configured to analyze the PWM voltage signal and, upon determining that the duty cycle of the PWM voltage signal is zero, output an interruption signal to a switch unit of the fan or to a second power supply unit in the current expansion circuit in order to cut off the electrical connection between the current expansion circuit and the fan, thereby stopping operation of the fan.

BRIEF DESCRIPTION OF THE SEVERAL VIEWS OF THE DRAWINGS

The technical principles, structural features, and objectives of the present invention will be best understood by referring to the following detailed description of some illustrative embodiments in conjunction with the accompanying drawings, in which.

DETAILED DESCRIPTION OF THE INVENTION

Figure 1:
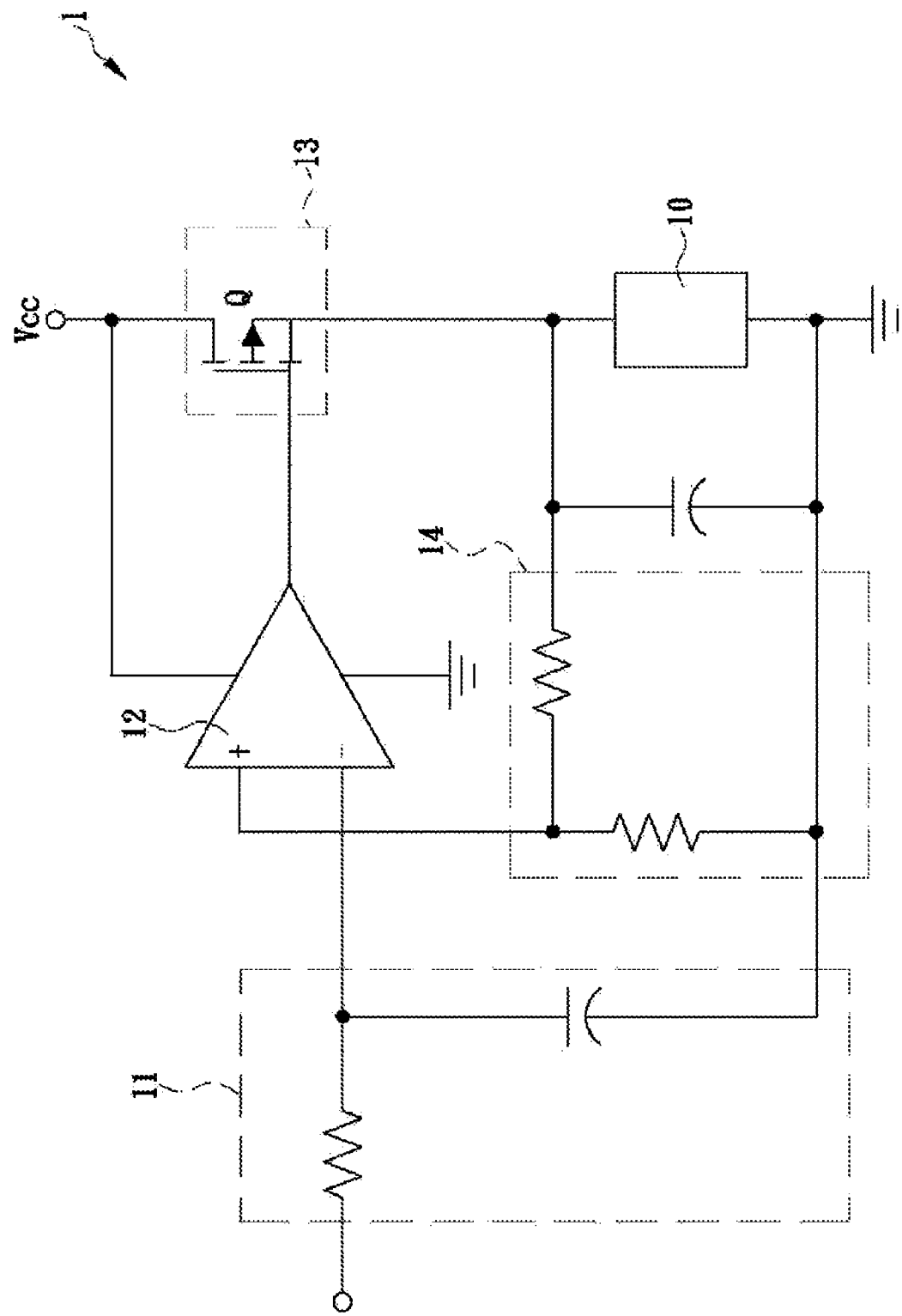
FIG. 1 is the circuit diagram of a conventional fan control circuit.
Figure 2:
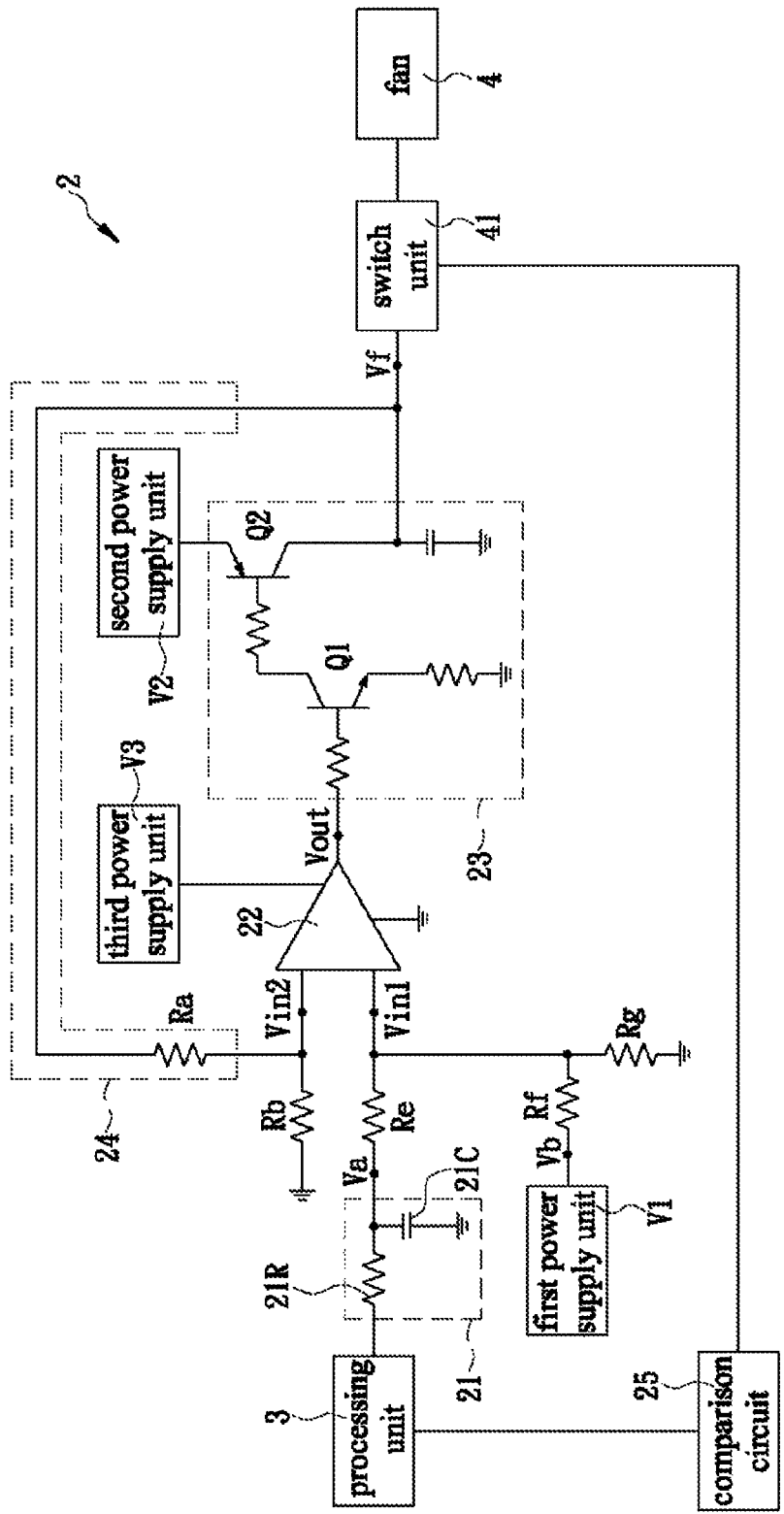
FIG. 2 is the circuit diagram of the fan control circuit in the first preferred embodiment of the present invention.

The present invention discloses a fan control circuit. Referring to FIG. 2 for the first preferred embodiment of the present invention, the fan control circuit 2 is applied to the circuit board of an electronic device (e.g., a computer) and includes a processing unit 3 and a fan 4. The processing unit 3 and the fan 4 are electrically connected through the fan control circuit 2 on the circuit board. The fan control circuit 2 includes a filter circuit 21, an amplifier circuit 22, a current expansion circuit 23, and a feedback circuit 24. The filter circuit 21 is composed of a first resistor 21R and a first capacitor 21C. The input end of the filter circuit 21 is electrically connected to the processing unit 3 in order to receive a PWM voltage signal from the processing unit 3. The PWM voltage signal is converted into a DC voltage signal via the first resistor 21R and the first capacitor 21C, and the DC voltage signal is in direct proportion to the duty cycle of the PWM voltage signal, wherein the duty cycle refers to the ratio of pulse duration to the period of a square wave.

The positive input end of the amplifier circuit 22 is separately connected to a first power supply unit V1 and the output end of the filter circuit 21 in order to receive the DC voltage signal and a static voltage signal from the first power supply unit V1. The amplifier circuit 22 performs addition on the DC voltage signal and the static voltage signal and then amplifies the combined signal to generate an amplified voltage signal at the output end of the amplifier circuit 22. The current expansion circuit 23 is composed of a front-end transistor Q1 and a back-end transistor Q2 connected in a cascade. The input end of the current expansion circuit 23 is connected to the output end of the amplifier circuit 22, and the output end of the current expansion circuit 23 is connected to the fan 4. Referring to FIG. 2, as the voltage Vout of the amplified voltage signal lies between 0 V and the critical voltage of the front-end transistor Q1, the current expansion circuit 23 performs current expansion on the amplified voltage signal upon receiving it and thereby generates a driving voltage signal and a driving current signal at the output end.

The feedback circuit 24 has two ends respectively connected to the negative input end of the amplifier circuit 22 and the output end of the current expansion circuit 23. Through negative feedback, the feedback circuit 24 delivers the driving voltage signal to the amplifier circuit 22 in order for the magnitude of the driving voltage signal, which is derived from the DC voltage signal by way of the amplifier circuit 22, the current expansion circuit 23, and the feedback circuit 24, to be in direct proportion to the duty cycle of the PWM voltage signal, and for the driving voltage signal to be greater than or equal to the lowest driving voltage value of the fan (about 4~5 V) when the duty cycle of the PWM voltage signal approaches zero.

According to the circuit structure of the present invention, the output driving voltage signal is in direct proportion to the duty cycle of the PWM voltage signal, and by adjusting the resistance values of the resistors Ra, Rb, Re, Rf, and Rg in the fan control circuit, the rate of amplification can be adjusted as follows (the signal processing process is analyzed below, using the calculation method of an ideal circuit, so as for a person skilled in the art to readily comprehend the principles of the circuitry of the present invention): In the ideal operating state of the amplifier circuit 22, the voltage Vin1 at the positive input end is equal to the voltage Vin2 at the negative input end. From the equation of negative feedback amplification, it can be known that the voltage Vf at the output end of the fan control circuit 2 and the voltage Vin1 bear the following relationship: Vf=Vin1*(1+Ra/Rb). Based on the current relationship at the positive input end of the amplifier circuit 22, we obtain (Va−Vin1)/Re+(Vb−Vin1/Rf), (Vin1/Rg), where Va and Vb are the voltage at the output end of the filter circuit 21 and the voltage at the output end of the first power supply unit V1 respectively. Assuming Re=Rf, the above two equations are combined to produce Vf=(Va+Vb)*(1+Ra/Rb)/(2+Re/Rg).

The table below shows experiment data obtained from tests in which the resistance Ra is set at 10 kohm, Rb at 3 kohm, Re at 300 kohm, Rg at 10000 kohm, and the static voltage signal at 2.3 V.

| PWM duty cycle | DC voltage signal (V) | Voltage at positive input end (V) | Driving voltage signal (V) |
| --- | --- | --- | --- |
| 0%   | 0    | 1.144 | 4.957  |
| 10%  | 0.33 | 1.306 | 5.662  |
| 20%  | 0.66 | 1.469 | 6.366  |
| 30%  | 0.99 | 1.631 | 7.071  |
| 40%  | 1.32 | 1.794 | 7.775  |
| 50%  | 1.65 | 1.956 | 8.480  |
| 60%  | 1.98 | 2.119 | 9.184  |
| 70%  | 2.31 | 2.282 | 9.888  |
| 80%  | 2.64 | 2.444 | 10.593 |
| 90%  | 2.97 | 2.607 | 11.297 |
| 100% | 3.3  | 2.769 | 12.002 |

According to the fan control circuit 2 of the present invention, the first power supply unit V1 will keep providing the static voltage signal to the amplifier circuit 22. Hence, even if the duty cycle of the PWM voltage signal approaches zero, the driving voltage signal output from the fan control circuit of the present invention is still high enough to drive the fan into operation. (While in this embodiment the driving voltage signal output from the fan control circuit 2 remains high enough to drive the fan 4 when the duty cycle is 0%, the fan control circuit may be modified such that the output driving voltage signal will not exceed the lowest driving voltage value unless the duty cycle is higher than 5%.)

In this embodiment, referring to FIG. 2, the front-end transistor Q1 is an NPN bipolar junction transistor, and the back-end transistor Q2 is a PNP bipolar junction transistor. Both transistors Q1 and Q2 are of a common-emitter configuration, and the output end of the front-end transistor Q1 is connected to the input end of the back-end transistor Q2. The other connections between the two transistors are detailed as follows: The base of the front-end transistor Q1 is electrically connected to the output end of the amplifier circuit 22, the base of the back-end transistor Q2 is electrically connected to the collector of the front-end transistor Q1, the emitter of the back-end transistor Q2 is electrically connected to a second power supply unit V2, and the collector of the back-end transistor Q2 outputs the driving voltage signal and the driving current signal to the fan 4. In addition to stably outputting the driving current signal and the driving voltage signal, the current expansion circuit 23 shortens the response time of the fan control circuit 2.

As the driving voltage signal output from the current expansion circuit of the present invention is delivered to the negative input end of the amplifier circuit 22 through negative feedback, samples for feedback are directly obtained from the fan 4, meaning the present state of the fan 4 is directly detected. That is to say, with negative feedback, the precision of the fan control circuit 2 will not be affected in spite of the fact that the property of the amplifier circuit 22 or the transistors Q1, Q2 varies with ambient temperature. In this embodiment, the fan control circuit 2 further includes a third power supply unit V3 for driving the amplifier circuit 22. Thus, the amplifier circuit 22 and the current expansion circuit 23 are driven by different power supply units V2 and V3 respectively. The circuit structure is so designed because the voltage signal provided by the third power supply unit V3 need not be the same as that provided by the second power supply unit V2, for the fan control circuit 2, which generates the driving voltage signal through a negative feedback structure, can easily and stably convert a low-voltage signal into one corresponding to the required driving voltage value of the fan 4. For example, the amplifier circuit 22 only has to output an amplified voltage signal of about 0~12 V in order for the driving voltage signal generated through the current expansion circuit 23 and the feedback circuit 24 to range between 0 and 36 V. As such, the application of the circuit becomes more flexible.

Referring again to FIG. 2, if the fan control circuit is so designed that, when the duty cycle of the PWM voltage signal is 0%, the output driving voltage signal is still capable of driving the fan 4, the fan control circuit 2 may further use a comparison circuit 25 to interrupt the operation of the fan 4. This comparison circuit 25 has one end electrically connected to the processing unit 3 so as to analyze the PWM voltage signal. Upon determining that the duty cycle of the PWM voltage signal is 0%, the comparison circuit 25 outputs an interruption signal to the switch unit 41 of the fan 4 to cut off the electrical connection between the current expansion circuit 23 and the fan 4. It should be pointed out that the arrangement of the comparison circuit 25 is not limited to the foregoing. It is feasible to connect the other end of the comparison circuit 25 to the second power supply unit V2 so that, upon determining that the duty cycle of the PWM voltage signal is 0%, the comparison circuit 25 generates an interruption signal to the second power supply unit V2 to cut off the electrical connection between the current expansion circuit 23 and the second power supply unit V2. By so doing, the output end of the current expansion circuit 23 can all the same be prevented from providing the fan 4 with the driving current signal and the driving voltage signal.

It is worth mentioning that the present invention not only incorporates the static voltage signal of the first power supply unit V1 into an addition process to solve the problem of "non-correspondence in signal conversion", but also uses the current expansion circuit 23 and the feedback circuit 24 to solve the "poor control" problem of the prior art. In practice, however, the first power supply V1 and the addition process are not necessary limitations of the present invention. The "negative feedback" and the "cascade connection of transistors" may be used alone to improve the performance of the conventional fan control circuits.

While the invention herein disclosed has been described by means of specific embodiments, numerous modifications and variations could be made thereto by those skilled in the art without departing from the scope of the invention set forth in the claims.

What is claimed is:

1. A fan control circuit (2), applicable to a circuit board of an electronic device, wherein the electronic device includes a processing unit (3) and a fan (4) electrically connected to the processing unit (3) through the circuit board, the fan control circuit comprising:

a filter circuit having an input end electrically connected to the processing unit for receiving a pulse-width modulation (PWM) voltage signal transmitted from the processing unit and converting the PWM voltage signal into a direct-current (DC) voltage signal, wherein magnitude of the DC voltage signal corresponds to duty cycle of the PWM voltage signal;

an amplifier circuit having a positive input end separately connected to a first power supply unit and an output end of the filter circuit for receiving a static voltage signal transmitted from the first power supply unit, and the DC voltage signal transmitted from the filter circuit, respectively, wherein the amplifier circuit is to perform addition on the DC voltage signal and the static voltage signal, and then amplifies the combined signal to generate an amplified voltage signal at an output end of the amplifier circuit;

a current expansion circuit having an input end connected to the output end of the amplifier circuit and an output end connected to the fan, wherein the current expansion circuit is configured to receive the amplified voltage signal transmitted from the amplifier circuit, perform a current expansion process on the amplified voltage signal, and thereby generate a driving voltage signal and a driving current signal at an output end of the current expansion circuit;

and a feedback circuit having two ends respectively connected to a negative input end of the amplifier circuit and the output end of the current expansion circuit for delivering the driving voltage signal back to the negative input end of the amplifier circuit through the feedback circuit, enabling the magnitude of the driving voltage signal derived from the DC voltage signal by way of the amplifier circuit, the current expansion circuit, and the feedback circuit to be in proportion to the duty cycle of the PWM voltage signal and, in the meantime, enabling the driving voltage signal to be greater than or equal to a lowest driving voltage value of the fan even when the duty cycle of the PWM voltage signal is approaching to zero;

wherein the first power supply unit keeps on providing the static voltage signal to the amplifier circuit even when the duty cycle of the PWM voltage signal is approaching to zero, the driving voltage signal output from the current expansion circuit is thus maintained to be greater than or equal to the lowest driving voltage value high enough for driving the fan into operation.

2. The fan control circuit of claim 1, wherein the current expansion circuit comprises a front-end transistor and a back-end transistor, the front-end transistor having an output end connected to an input end of the back-end transistor.

3. The fan control circuit of claim 2, wherein the transistors are bipolar junction transistors, the front-end transistor has a base electrically connected to the output end of the amplifier circuit, and the back-end transistor has a base electrically connected to a collector of the front-end transistor, an emitter electrically connected to a second power supply unit, and a collector for outputting the driving voltage signal and the driving current signal to the fan.

4. The fan control circuit of claim 1, further comprising a comparison circuit, the comparison circuit being electrically connected to the processing unit in order to analyze the PWM voltage signal and, upon determining that the duty cycle of the PWM voltage signal is zero, output an interruption signal to a switch unit of the fan, thereby cutting off electrical connection between the current expansion circuit and the fan.

5. The fan control circuit of claim 2, further comprising a comparison circuit, the comparison circuit being electrically connected to the processing unit in order to analyze the PWM voltage signal and, upon determining that the duty cycle of the PWM voltage signal is zero, output an interruption signal to a switch unit of the fan, thereby cutting off electrical connection between the current expansion circuit and the fan.

6. The fan control circuit of claim 3, further comprising a comparison circuit, the comparison circuit being electrically connected to the processing unit in order to analyze the PWM voltage signal and, upon determining that the duty cycle of the PWM voltage signal is zero, output an interruption signal to a switch unit of the fan, thereby cutting off electrical connection between the current expansion circuit and the fan.

7. The fan control circuit of claim 3, further comprising a comparison circuit, the comparison circuit being electrically connected to the processing unit in order to analyze the PWM voltage signal and, upon determining that the duty cycle of the PWM voltage signal is zero, output an interruption signal to the second power supply unit, thereby preventing the output end of the current expansion circuit from outputting the driving voltage signal and the driving current signal to the fan.

\* \* \* \* \*